United States Patent
Podevels et al.

(10) Patent No.: US 6,533,198 B1
(45) Date of Patent: Mar. 18, 2003

(54) TOP DRESSER

(75) Inventors: Dean A. Podevels, Chanhassen, MN (US); Randel J. McCrackin, Paola, KS (US); Dennis J. Deets, Medford, MN (US); Bruce A. Granger, Prior Lake, MN (US)

(73) Assignee: The Toro Company, Bloomington, MN (US)

( * ) Notice: Subject to any disclaimer, the term of this patent is extended or adjusted under 35 U.S.C. 154(b) by 29 days.

(21) Appl. No.: 09/714,057

(22) Filed: Nov. 16, 2000

Related U.S. Application Data

(60) Provisional application No. 60/165,689, filed on Nov. 16, 1999.

(51) Int. Cl.⁷ ............................................. A01C 19/00
(52) U.S. Cl. ..................... 239/676; 237/657; 237/672; 237/681; 237/684; 237/685; 237/668
(58) Field of Search ................................ 239/660, 661, 239/663, 664, 672, 676, 677, 679, 681, 684, 685, 668, 674, 650, 657; 60/488; 280/124.11, 124.111, 124.112, 81.1

(56) References Cited

U.S. PATENT DOCUMENTS

| | | | |
|---|---|---|---|
| 1,606,676 A | * 11/1926 | Urann | 239/660 |
| 2,696,770 A | * 12/1954 | McKesson | 280/81.1 |
| 2,961,829 A | * 11/1960 | Weisenbach | 60/454 |
| 3,507,452 A | * 4/1970 | Dreyer | 239/673 |
| 3,646,455 A | * 2/1972 | Bauer | 60/455 |
| 4,212,428 A | * 7/1980 | Walker | 222/622 |
| 4,288,008 A | 9/1981 | Amblard et al. | 222/281 |
| 4,394,975 A | * 7/1983 | Bare et al. | 239/143 |
| 4,438,873 A | 3/1984 | Kaercher, Jr. | 222/616 |
| 5,170,948 A | * 12/1992 | Glick et al. | 239/666 |
| 5,307,952 A | 5/1994 | Worrel et al. | 222/1 |
| 5,307,965 A | 5/1994 | Worrel | 222/616 |
| 5,340,033 A | 8/1994 | Whitell | 239/676 |
| 5,700,189 A | * 12/1997 | Farris | 451/555 |
| 6,036,275 A | * 3/2000 | Hansen et al. | 239/657 |
| 6,202,944 B1 | * 3/2001 | McCrory | 239/658 |

* cited by examiner

Primary Examiner—Christopher Kim
(74) Attorney, Agent, or Firm—Fulbright & Jaworski L.L.P.

(57) ABSTRACT

A top dresser for distributing particulate matter on a variety of terrain. The top dresser may includes a towable frame which is operatively connected to a pair of wheel assemblies. Each wheel assembly is rotatingly attached to the frame of the top dresser in such a fashion as to enable the wheels of the wheel assembly to follow the contours and undulations in the terrain over which it traverses. Each wheel assembly is operatively connected to a hydraulic pump which is in turn operatively connected to a hydraulic circuit which is used to control and power various elements of the top dresser. The top dresser includes a hopper with gate assembly and a conveyor to distribute particulate matter at predetermined rates to the terrain. The gate assembly is adjustable and includes a biased gate which deflects in response to contact with large nonconformities such as rocks. The conveyor belt is a pre-manufactured substantially continuous loop of material which has a patterned or otherwise roughened surface. The conveyer belt is supported between a pair of roller assemblies, including a drive roller having a textured metal oxide coating for enhancing the friction coefficient between the belt and the drive roller assembly. The conveyor belt and the attendant roller assemblies may be accessed by shifting a portion of the top dresser, and the conveyor belt and attendant roller assemblies may be in turn shifted to permit replacement, repair and inspection. A hydraulic circuit is provided with a charge pump assembly which eliminates the need to maintain a pressurized reservoir, thus reducing leakage during periods of inactivity.

32 Claims, 7 Drawing Sheets

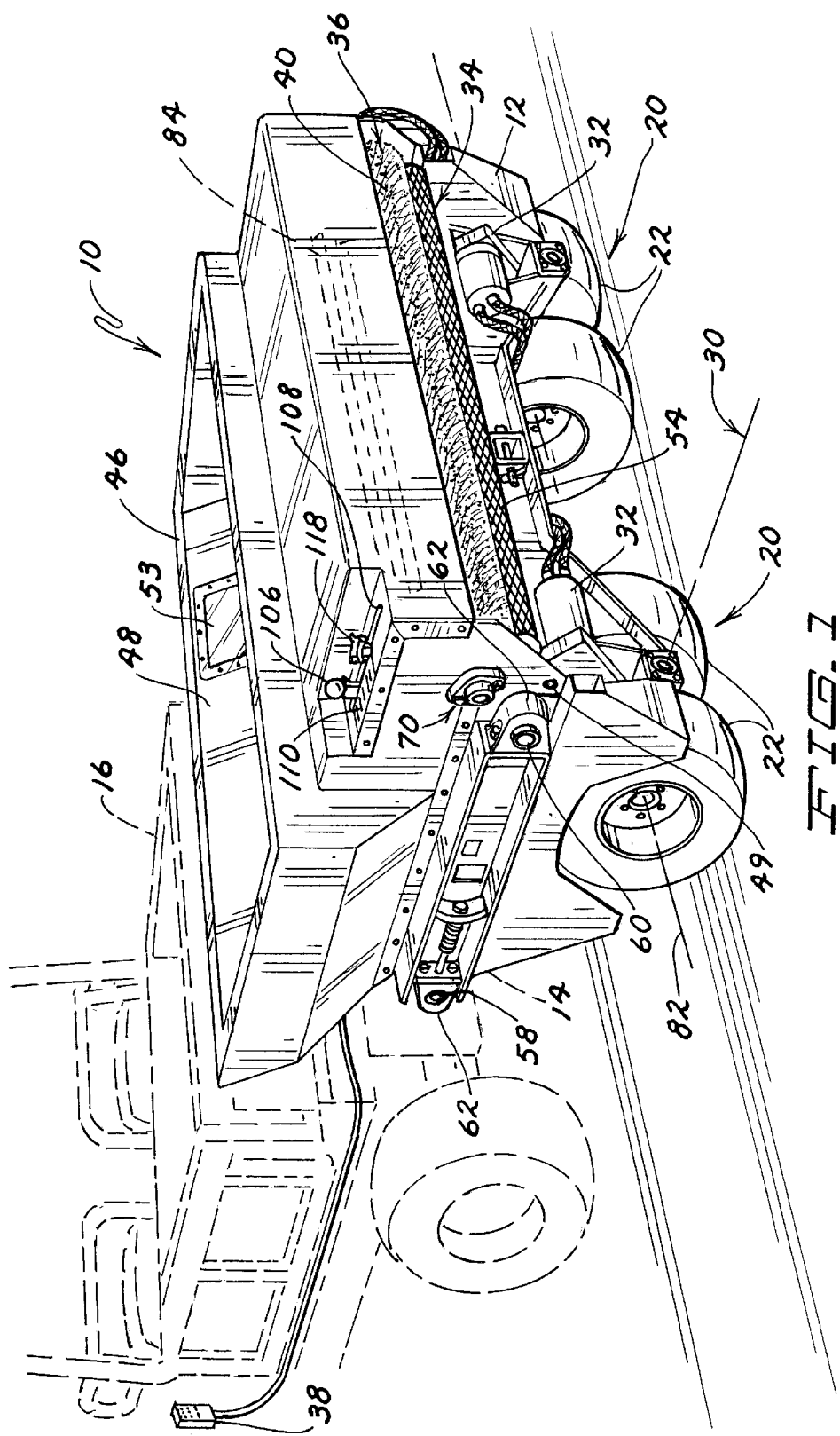

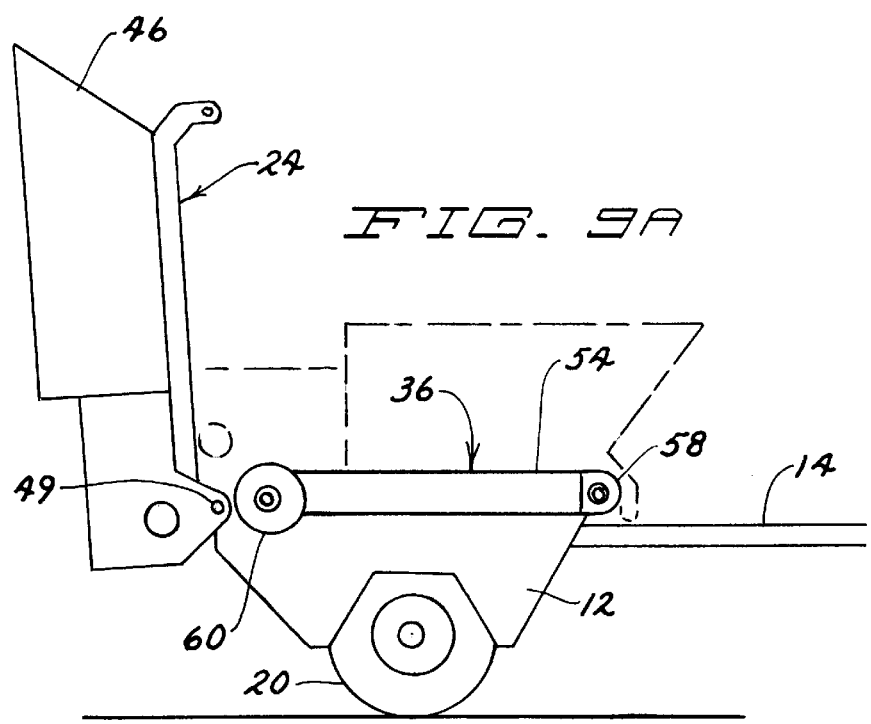
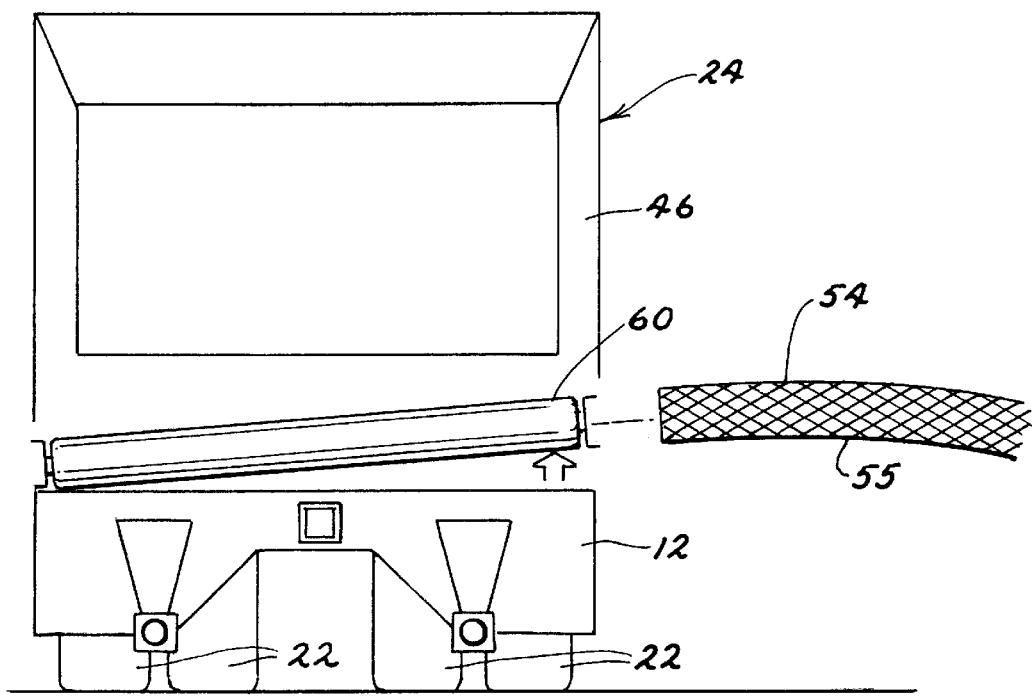

TOP DRESSER

This application claims the benefit of priority pursuant to 35 USC §119(e)(1) from the provisional patent application filed pursuant to 35 USC §111(b): as Serial No. 60/165,689 on Nov. 16, 1999.

BACKGROUND OF THE INVENTION

1. Field of the Invention

The present invention relates generally to devices for spreading or dispensing particulate matter upon a traversed terrain, and in particular to a device for top dressing turf.

2. Description of the Prior Art

Top dresser devices utilizing a wide variety of technologies are well known in the art. One particular class of top dressers includes a frame-mounted hopper for receiving particulate matter, a flexible belt for transporting the particulate matter along the hopper, and a brush assembly for dispensing the particulate matter as it is conveyed along the belt. Yet another class of top dressers includes a tow-behind variety, wherein a top dresser device is disposed upon a towable frame and drawn across the terrain by a traction vehicle. Power for the belt and brush assemblies may be external or internal to the top dresser. An external power source may, for example, be an accessed hydraulic system of the traction vehicle. Alternatively, internal power sources may include a separate internal combustion engine or a ground driven mechanism. Generally, the term "ground driven" refers to the interaction of an apparatus as it moves relative to the ground; in this instance, the support wheels of a top dresser as they roll along the ground. Ground driven mechanisms may include systems for mechanically or hydraulically coupling the support wheels of a top dresser to provide power other components of the top dresser during operation. In a hydraulic powered ground driven top dresser, for example, support wheels may be coupled to hydraulic pumps to provide pressurized fluid to drive the top dresser.

Prior art top dressers present several substantial limitations. One limitation of hydraulic power based ground driven top dressers is the requirement of an adequate supply of pressurized fluid to the inlet ports of the wheel driven pumps. It has been recognized that inlet fluid pressurization is needed to charge the wheel driven hydraulic pumps to prevent cavitations, dry runs, etc., and for this reason supply reservoirs have been pressurized. Reservoir pressurization presents relatively few problems during top dresser operation. However, reservoir pressurization may promote leakage within the system, particularly at the wheel driven hydraulic pumps whenever the top dresser is inactive. This is particularly problematic because hydraulic fluid may damage turf surfaces. Furthermore, the use of fluidic systems which have pressurized containers may require periodic inspection, certification and/or regulatory compliance before they can be introduced into certain markets.

Another limitation of prior art top dressers has been impaired machine operation over uneven or irregular terrain. In such terrain, a tire may temporarily lift away from or "skip" over the ground and tear or scuff the turf when the tire re-contacts the turf surface. Another limitation related to skipping is the uneven distribution of weight that occurs between the adjacent tires when the top dresser traverses over undulating terrain. As the top dresser traverses such terrain and one of the tires is unable to maintain contact with the ground, all of the weight that is normally supported by the adjacent tires must now be supported by the tire(s) which remains in contact with the ground. This reduces the ground contact area and increases the ground contact pressure. Turf rutting or other damage may result as the weight of the top dresser is transferred to the other tires(s) in contact with the ground.

Yet another limitation of some prior art top dressers is the inability to evenly distribute material at a substantially consistent predetermined application or coverage rate (e.g., lbs. of top dressing material per square yard of turf) irrespective of the speed at which the top dresser is being moved relative to the terrain. In this regard, in order for the application rate (lbs. per square yard) to be consistent, the distribution rate (lbs. per second) of material exiting the top dresser needs to be proportional to the ground speed (feet per second) of the top dresser. Operation of some prior art ground driven top dressers at varying ground speeds may result in uneven distribution of material upon the turf surface. For example, an application rate greater than desired when the top dresser slows below a nominal operating ground speed, or an application rate less than desired when the top dresser exceeds a nominal operating ground speed. Particular solutions to the problem have included unduly complex regulating mechanisms which are difficult to maintain and prone to breakdown. Known regulating mechanisms may include clutches, chains, and shafts, each of which are especially prone to damage in hostile environments.

Another related limitation of some prior art top dressers is the inability to accommodate nonconformities such as large rocks or other debris mixed in with the top dressing material. This is not an unusual or rare occurrence because top dressing material is typically stored outdoors and is susceptible to many forms and sources of contamination. Large rocks or debris contained within a mixture of top dressing material may become lodged at the metering gate mechanism resulting in uneven material distribution and/or damage to the conveyer belt and the gate mechanism. Thus, an operator of a top dresser must not only keep a watchful eye on the distribution rate, but is compelled to periodically stop the top dresser and inspect the gate mechanism for nonconformities. This may result in significant down time even if the inspection does not reveal any nonconformities. One time consuming approach in dealing with nonconformities may be to pre-condition or pre-screen the top dressing material prior to, or during loading of the hopper of a top dresser. Another approach may be to store the top dressing material in a controlled environment.

Another limitation of some prior art top dressers concerns the effort required to install a conveyer belt on the top dresser, as during initial manufacture, or replacement of a worn or damaged belt. Initial installation and replacement or repair of worn or damaged belts has generally been a tedious and time-consuming task, at best. Often, a top dresser must be substantially dismantled in order to access a conveyor belt and its attendant roller assemblies. This process may also require specially designed fixtures, equipment and trained personnel to make the necessary repairs and/or replacement, and may result in significant down time.

Another limitation of some prior art top dresser concerns the longevity or working life of the conveyer belt. The typical prior art conveyor belt is formed by taking opposing ends of a length of suitable material and joining them together by well known linking or seaming techniques, including mechanical link structures. Conveyer belts often degrade at or near the links, as the structures are generally more rigid than the belt material. Additionally, conveyor belts may fail or be damaged due to imperfections, the use of incompatible linking materials, extremes in temperature, stretching, etc. A need therefore exists for a conveyer belt having improved durability provided by an elimination of a mechanical linking structure.

In summary, there is a need for a top dresser with support wheels which do not skip or scuff as they travel along uneven terrain. Still a further need exists for a top dresser which is able to distribute particulate matter at a predetermined application rate irrespective of the speed of the top dresser. A need also exists for a top dresser with a dispensing apparatus which is able to accommodate large nonconformities effectively and efficiently. Additionally a need exists for a top dresser which has a conveyor belt which less susceptible to premature separation and which is easy to access and service. And there is still further a need for a top dresser with a hydraulic circuit which is less prone to fluid leakage during periods of inactivity.

SUMMARY OF THE INVENTION

A top dresser for distributing particulate matter on a variety of terrain. In one embodiment, the top dresser includes a towable frame which is operatively connected to a pair of wheel assemblies. Each wheel assembly is rotatingly attached to the frame of the top dresser in such a fashion as to enable the wheels of the wheel assembly to follow the contours and undulations in the terrain over which it traverses. Each wheel assembly is operatively connected to a power converter such as a hydraulic pump or an electrical generator which is, in turn, operatively connected to a hydraulic or electrical circuit, as the case may be, which is used to control and power various elements of the top dresser.

A top dresser according to the present invention includes a hopper with a metering gate assembly and a conveyor to distribute particulate matter at predetermined rates to the terrain. The gate assembly is adjustable and includes a gate which is temporarily displaced in response to large nonconformities such as rocks. The conveyor belt is a premanufactured "seamless" or continuous loop of material having a patterned or otherwise roughened surface for conveying the particulate matter. The conveyer belt is termed "seamless" in that no external link structure is necessary to join the ends of the belt material to form the belt loop. The conveyer belt is movably supported between a pair of roller assemblies, including a drive roller assembly having a metal oxide surface for enhancing the friction coefficient between the roller and the conveyer belt. The conveyor belt and the attendant roller assemblies may be accessed by shifting a portion of the top dresser, and the conveyor belt and attendant roller assemblies may be in turn shifted to permit replacement, repair and inspection. A hydraulic circuit is provided with a charge pump assembly which eliminates the need to maintain a pressurized reservoir, thus reducing leakage during periods of inactivity.

Accordingly, it is an object of the present invention to provide an improved granular material spreader that is efficient in operation across a variety of terrain. In particular, a towable top dressing device is provided having a pair of wheel sets or assemblies which may independently follow the contours of uneven terrain. In one preferred embodiment, each pair of wheel sets or assemblies may undergo a "rolling" motion relative to the frame and other wheel set to maintain contact with the ground. It is another aspect of the present invention to minimize the uneven distribution of weight between the wheels of a towed top dresser.

It is another object of the present invention to provide a towable, vehicle-mounted, or self-propelled top dresser which evenly distributes material at a substantially constant predetermined coverage rate (e.g., lbs. of top dressing material per square yard of turf) irrespective of the speed at which the top dresser is moved relative to the terrain. In this regard, in order for the application rate (lbs. per square yard) to be consistent, the distribution rate (lbs. per second) of material exiting the top dresser needs to be proportional to the ground speed (feet per second) of the top dresser.

Another object of the present invention is to provide an improved gate assembly for permitting the top dresser to distribute top dressing material which may have nonconformities such as rocks or other debris incorporated therein. The improved gate assembly includes a biased gate relief assembly or release device which is temporarily displaceable to permit nonconformities or outsized objects such as rocks and debris to pass thereby with minimal risk of damage to the conveyor belt and gate assembly of the top dresser. In this regard, the top dresser of the present invention is able to use top dressing mixtures which would otherwise require preconditioning prior to application.

It is another object of the present invention to provide a ground driven hydraulic power based top dresser having an improved hydraulic circuit for selectively powering a conveyor belt and a brush assembly. An improved hydraulic circuit eliminating the necessity of a pressurized reservoir system is provided in an embodiment of the present invention. Additionally, a feature of the hydraulic circuit is that it is able to assist in braking the utility vehicle and top dresser under some conditions.

It is yet another object of the present invention to decrease the amount of down-time by the use of a longer lasting conveyor belt with improved access thereto for maintenance and replacement.

These and further objects and advantages of the present invention will become clearer in light of the following detailed description of preferred embodiments in connection with the drawings.

BRIEF DESCRIPTION OF THE DRAWINGS

FIG. 1 is a perspective view of a ground driven top dresser according to the present invention illustrated in connection with a utility traction vehicle;

FIG. 9a is a schematic side elevational view of the top dresser illustrating access to the conveyor belt and the front and rear roller assemblies;

FIG. 9b is a schematic front elevational view of the top dresser illustrating replacement of a conveyor belt.

DETAILED DESCRIPTION OF THE PREFERRED EMBODIMENTS

Figure 3:
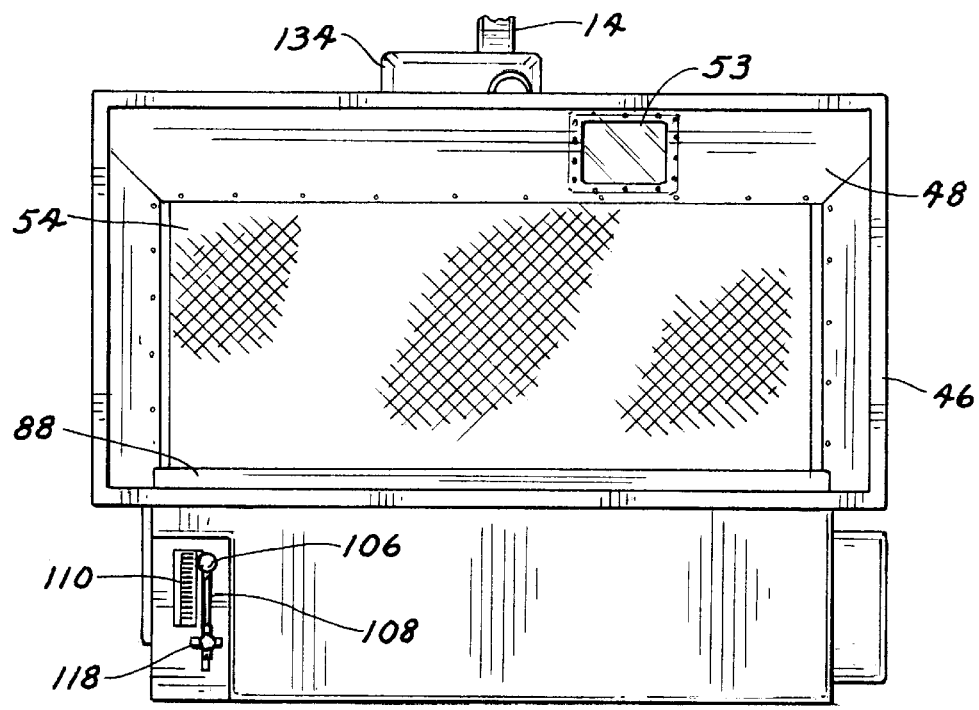
FIG. 3 is a top plan view of the top dresser of FIG. 1.

Referring now to the drawings wherein like numerals designate like parts throughout, one preferred embodiment of the present invention is illustrated in FIG. 1 as a tow-behind top dresser device 10. The top dresser 10 includes a frame 12 having a drawbar 14 by which the top dresser 10 may be coupled to a traction or utility vehicle 16 and drawn across a turf surface 18. One particularly suitable traction vehicle 16 may be, for example, a Toro Workman® utility vehicle manufactured by the assignee of the present invention. While one embodiment of the present invention described herein references a tow-behind top dresser 10 used in conjunction with a traction vehicle 16, aspects of the invention may be applicable to other types of top dressers, such as vehicle mounted or self propelled devices (not shown), etc., as may be appreciated by those skilled in the relevant arts.

Figure 5:
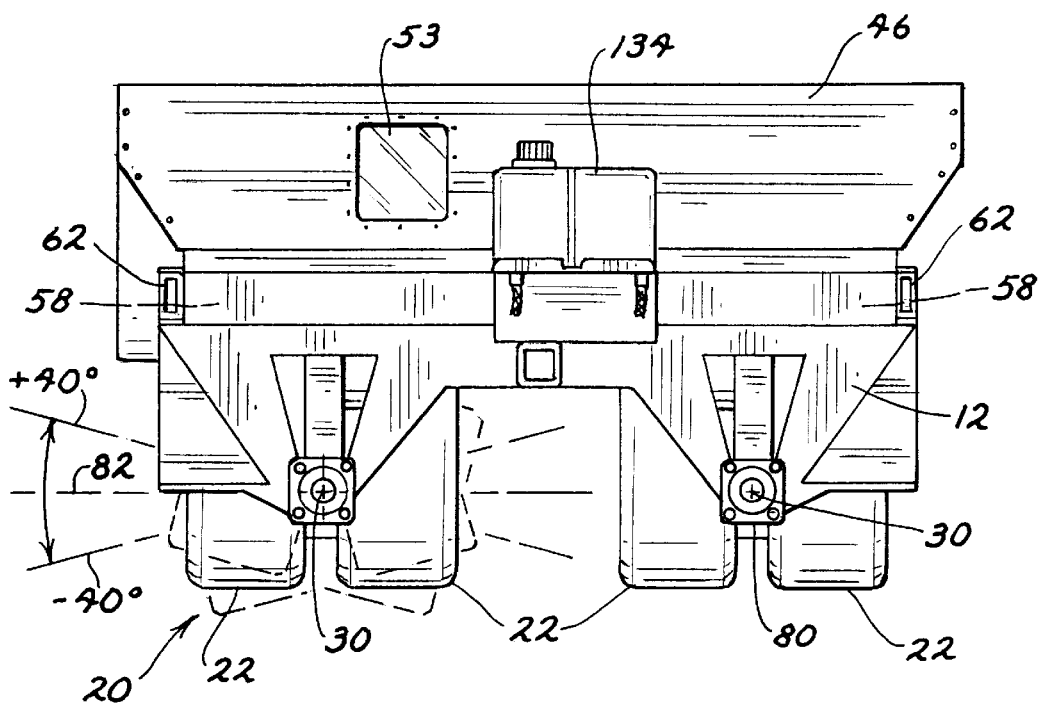
FIG. 5 is a front elevational view of the top dresser of FIG. 1 illustrating the ground following capability of the right axle set.

The top dresser 10 is preferably rollingly supported upon the ground 18 by a pair of wheel assemblies 20, each having a pair of wheels 22. To minimize tire marking of distributed material, the transverse track width between the wheel assemblies 20 is sized in relation to the particulate matter drop zone width. As further discussed herein and as particularly illustrated in FIGS. 2, 4, and 5, each wheel assembly 20 is pivotally coupled to the frame 12 about a longitudinal axis 30 which is orthogonally oriented relative to the axis of rotation of the paired wheels 22 of each wheel assembly 20. This arrangement allows the wheels 22 to follow undulations and contours of the traversed turf 18. In this regard, each wheel assembly 20 may undergo a "rolling" motion relative to the direction of motion of the frame 12 of the top dresser 10 to maintain contact over a variety of local turf environments. Additionally, each wheel assembly 22 is operatively coupled to a power generator such as a hydraulic motor 32 functioning as a pump for the hydraulic circuit 130 of the present invention. As disclosed herein, power for a movable surface or belt assembly 34 and brush device 36 is developed by the wheel driven pumps 32 and conducted via conventional power transmission conduits of the hydraulic circuit 130 (See, FIG. 10).

Figure 7:
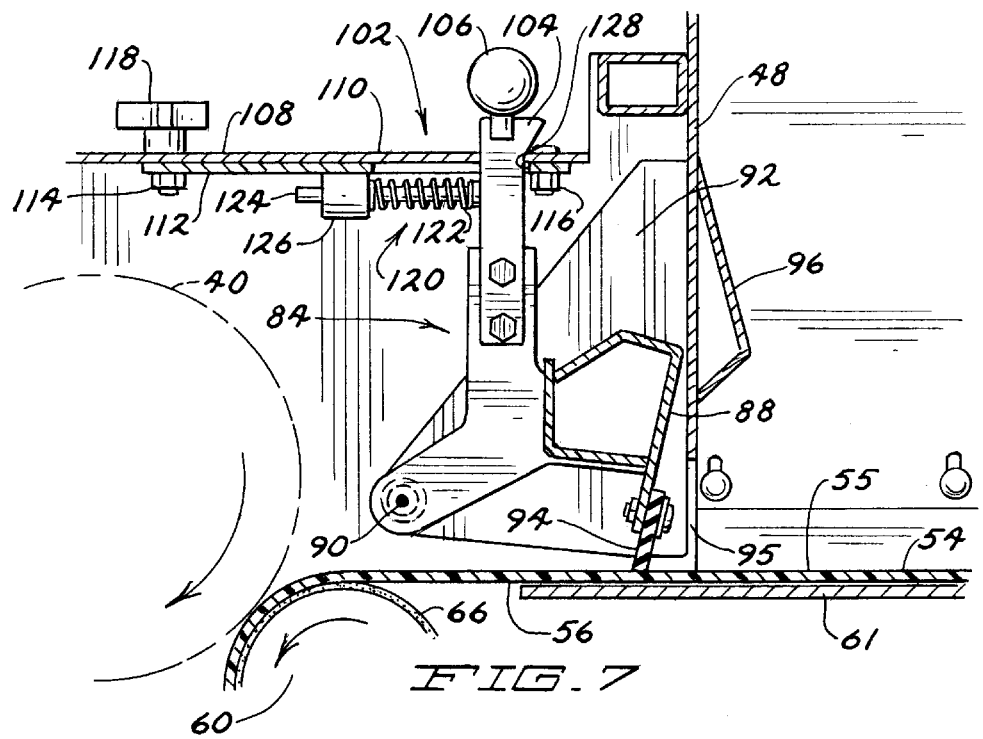
FIG. 7 is a detailed cross sectional view of a portion of the top dresser of FIG. 2 taken along line 7—7 and illustrating the gate mechanism and gate release device.

Operator control of the belt and brush assemblies 34, 36 may be made via a remote switch 38, such as a hand-held electric switch providing on-off instructions. As described hereinafter with reference to the hydraulic circuit 130 of FIG. 10, in the preferred embodiment the remote switch 38 may include a 12 volt power lead for activating a solenoid valve component 172 of the hydraulic circuit 130 to initiate movement of the belt and brush assemblies 34, 36. Additionally, user control of the application rate of top dressing material may be made by adjusting the gate assembly 84 as illustrated in FIGS. 7 and 8, and as described below.

Again with reference to FIGS. 1 and 3, the top dresser 10 includes a hopper 46 for receiving particulate matter 42 to be distributed. The hopper 46 is disposed upon the frame 12 and includes a plurality of sloping front, rear and side surfaces 48, an open top or upper portion 50, and a substantially closed bottom or lower portion 52 in communication with a conveyer belt 54. Hopper 46 includes a window 53 on its front surface 48 which permits the operator to visually assess the level of top dressing material 42 within the hopper 46 during operation. As described hereinafter with particular reference to FIGS. 9A and 9B, the hopper 46 may be temporarily shifted with respect to the frame 12 and pivoted about pivot points 49 to gain access to the belt 54, as during maintenance or belt 54 removal.

The belt assembly 34 of the present invention preferably includes a "seamless" or continuous conveyor belt 54 lacking any separate mechanical joint or linking structure as provided in prior art top dressers. The belt 54 is preferably a length of PVC/fiber reinforced belt material joined at its ends with a finger or dovetail splicing. The belt joint area proximate the dovetail splicing is rejoined with PVC material and patterned to match the belt material pattern 55. The patterned or otherwise roughened surface 55 of the belt 54 is for engaging the top dressing material 42 within the hopper 46 and facilitating the conveyance thereof along and out of the hopper 46. The belt 54 is operatively connected to and rollingly engaged by a front roller assembly 58 and a powered rear roller assembly 60 and is disposed adjacent the bottom of the hopper 46 to receive the top dressing material 42 contained therein. The inwardly facing surface 56 of the belt 54 is in slideable contact with a platen 61 or plate surface situated within the interior region of the belt 54 to support the top dressing material 42 within the hopper 46. As stated previously, the use of a "seamless" belt is preferred over conventional spliced belts in that it is better able to withstand the environment in which it operates. The preferred continuous belt 54 of the present invention is provided by All-State Industrial Rubber and Belting, of West Des Moines, Iowa. One particular approach to belt 54 replacement is also provided by the present invention and is discussed herein with particular reference to FIGS. 9A and 9B.

Front and rear roller assemblies 58, 60 each include a pair of bearing assemblies 62 for rotatably and transversely disposing the roller assemblies 58, 60 upon the frame 12 of the top dresser 10. Rear roller assembly 60, which may be selectively powered by a belt motor 64 of the top dresser hydraulic circuit 130 as further described herein, includes a friction enhancing surface, such as an applied metal oxide surface 66, for increasing the friction coefficient between the rear roller 60 and the inwardly facing surface 56 of the belt 54. Other friction enhancing surfaces may also be practicable, including other applied coatings, textured roller surfaces, etc. Belt motor 64 power may be selectively controlled by the operator via the remote switch 38, as disclosed in FIGS. 1 and 10, and further described herein.

Figure 4:
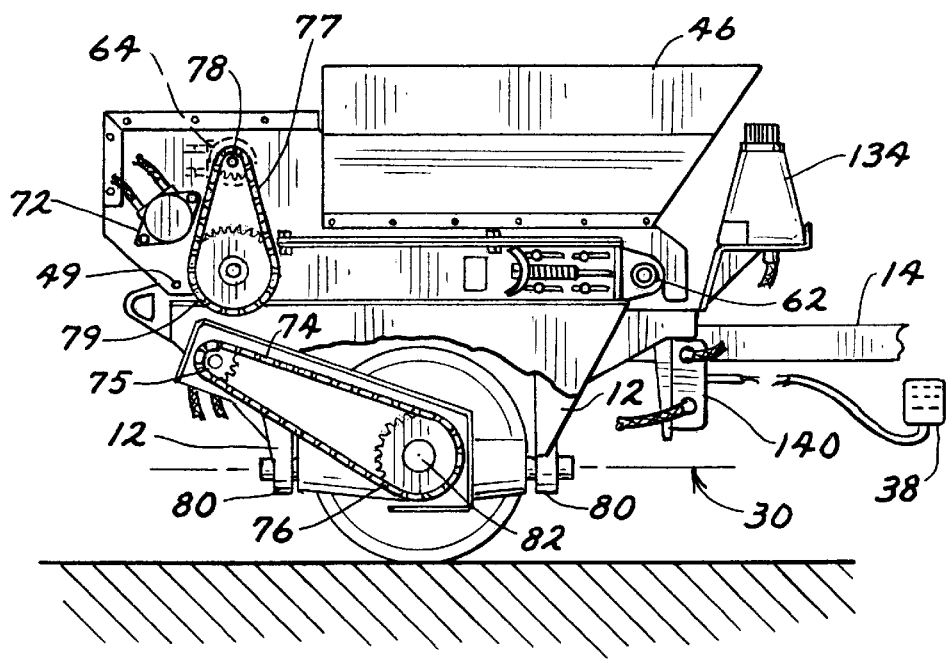
FIG. 4 is a partially cut-away right side elevational view of the top dresser of FIG. 1.

Referring particularly to FIGS. 1, 4, and 7, the top dresser 10 further includes a brush assembly 36 for engaging the top dressing material 42 and rearwardly propelling it from the belt 54 to the turf surface 18. The brush 40 of the brush assembly 36 is rotatably disposed upon the frame 12 via brush bearing assemblies 70 and is in substantially parallel alignment with the belt 54 of the belt assembly 34. The brush 40 is preferably rotatably driven via the hydraulic circuit 130 to work the top dressing material 42 from the patterned belt surface 55. Operation of the brush assembly 36 may be controlled via operator access to the hydraulic circuit 130 as disclosed in FIG. 10, and further described herein.

Figure 2:
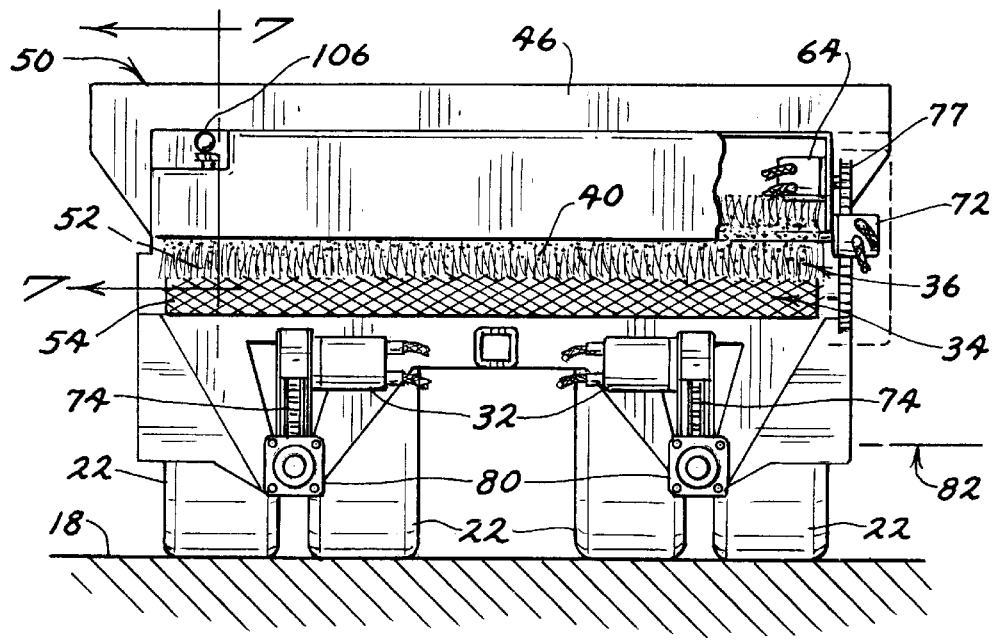
FIG. 2 is a rear elevation view of the top dresser of FIG. 1.

Various hydraulic circuit 130 componentry of a preferred embodiment of the present invention is illustrated in FIGS. 2 and 4, and includes a pair of low speed high torque (LSHT) wheel driven motors 32 functioning as pumps, a brush motor 72 and a belt motor 64. Each wheel driven pump 32 is operatively connected to a wheel assembly 20 via a chain 74 and appropriately sized sprockets 75, 76. Preferably, the wheel driven motors 32 have a pumping capacity of approximately 5.4 cubic inches per revolution. It will be appreciated that the fluid output developed for each wheel driven pump 32 varies with the speed at which the top dresser 10 traverses a terrain. The brush and belt motors 72, 64 may be fluidly coupled to the hydraulic circuit 130 so as to receive the fluid output from one or more wheel driven pumps 32. In the illustrated embodiment, brush motor 72 is disposed upon the frame 12 and directly coupled to the brush 40 of the brush assembly 36, while belt motor 64 is coupled to the rear roller assembly 60 via chain 77 and appropriately sized sprockets 78, 79. The brush and belt motors 72, 64 have a preferred input capacity of approximately 2.3 and 29.8 cubic inches per output revolution, respectively. As with the wheel driven motors 32, it will be appreciated that the fluid output developed at the brush and belt motors 72, 64 varies with the speed at which the top dresser 10 traverses a terrain.

Figure 6:
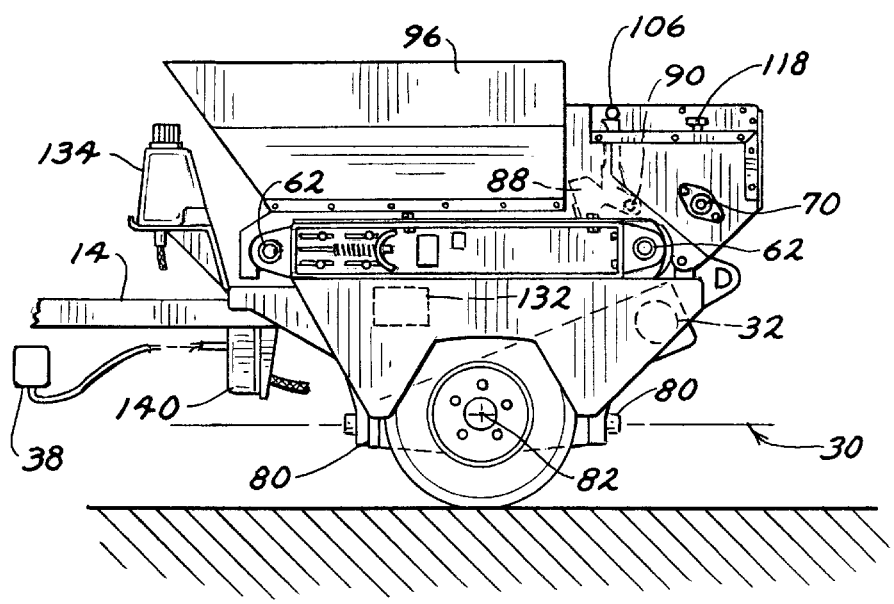
FIG. 6 is a left side elevational view of the top dresser of FIG. 1.

Referring again to FIGS. 4–6, each wheel assembly 20 is mounted to the frame 12 through longitudinally aligned bearings 80 to permit pivoting movement of the wheel assembly about a longitudinal axis 30 which is parallel to the direction of motion of the top dresser 10 as it traverses a terrain. FIG. 4 is a partial cut-away view illustrating a wheel set 20 and associated bearing 80 assemblies. For enhanced terrain handling and overall stability of the top dresser 10, the longitudinal axes 30 of the wheel assembly bearings 80 are disposed below (further from the hopper and closer to the ground surface than) the wheel bearing axes 82. Placement of the longitudinal wheel assembly axes 30 below the wheel bearing axes 82 enhances device stability by preventing undesirable "overcenter" tilting of the wheel assembly 20. As illustrated particularly in FIG. 5, movement of the left wheel assembly 20 is defined by a range of motion which permits the wheels 22 of the wheel assembly 20 to follow undulations and contours of the traversed turf. As depicted, the wheel assembly 20 may roll approximately ±20 degrees with respect to the top dresser frame 12. Importantly, each wheel assembly 20 may separately and independently undergo "rolling" type motions relative to the frame 12 of the top dresser 10 to maintain contact over a variety of local turf surfaces.

FIGS. 3, 7 and 8 illustrate a gate assembly 84 for metering the top dressing particulate material 42 out of the hopper 46 and providing a release mechanism to permit nonconformities 86 such as large rocks or other debris to pass out of the hopper 46. Gate assembly 84 includes a pivotable gate 88 coupled to the frame 12 of the top dresser 10 at pivot points 90. Gate 88 extends transversely across the conveyer belt 54 between a pair of brackets 92. Referring to FIG. 7, gate 88 is rotatably coupled at each end to a bracket 92 to permit pivot action thereabout. A seal member 94 of rubber or other material is secured to a lower edge of the gate 88 and extends across the belt 54 surface. The rear hopper wall surface 48 extends downwardly ahead of the gate assembly 84 and includes a triangular shaped structure 96 for strengthening the wall against deflection. Defined beneath the triangular structure 96 of the rear wall 48 is an elongate aperture 95 extending transversely across the belt 54. The aperture 95 is configured so that it effectively limits the maximum distribution rate for top dressing material for the top dresser 10 (as when the gate 88 is raised into its highest position possible (not shown)).

As further discussed with reference to FIG. 8, the seal 94 and the conveyer belt 54 define a distance 100 which determines the mean rate of particulate distribution. This distance 100 may be varied by selectively moving the gate 88 of the gate assembly 84. To facilitate moving the gate, the gate assembly 84 is provided with a gate release device 102 having an adjusting handle 104 and a user manipuable knob 106. Adjusting handle 104 is received within an elongate rate adjusting channel 108 (See FIG. 3) of the frame and may be user biased within the channel 108 in relation to a calibrated rate scale 110 to vary the distance 100 between the seal 94 and the belt 54 and thus vary the mean rate of top dressing particulate distribution. The adjusting handle 104 is maintained in a selected position relative to the rate scale 110 by slideable gate release plate 112, and as further discussed with reference to the gate release device 102.

As illustrated in FIGS. 7–8, an additional feature of the gate assembly 84 is that the gate release device 102 which permits a transient deviation in the distance 100 between the seal 94 and the belt 54 in order to allow large rocks 86, debris or nonconformities to pass therebetween. As a result, the particulate distribution rate of the top dresser 10 may exhibit corresponding transient spike(s) which differ from the preselected mean particulate distribution rate. Gate release device 102 includes the gate release plate 112 which is selectively and slideably coupled to the frame 12 of the top dresser 10 with first and second fasteners 114, 116. The first fastener 114 includes a gate locking knob 118 which the user may manipulate to loosen the gate release plate 112. Upon loosening the plate 112, the user may adjust the distribution rate with reference to the rate scale 110, and then selectively secure the plate 112 in place to fix the distribution rate. Additionally coupled to the gate release plate 112 is a release assembly 120. Release assembly 120 includes a biasing element 122, a clevis pin 124 received within the biasing element 122, and a pin support 126. Biasing element 122 engages the adjusting handle 104 to urge the adjusting handle 104 away from the pin support 126 and into contact with an edge 128 of the gate plate 112. Preferably, the biasing element is a spring, however, it is understood that other restorative devices may be used.

Figure 8A:
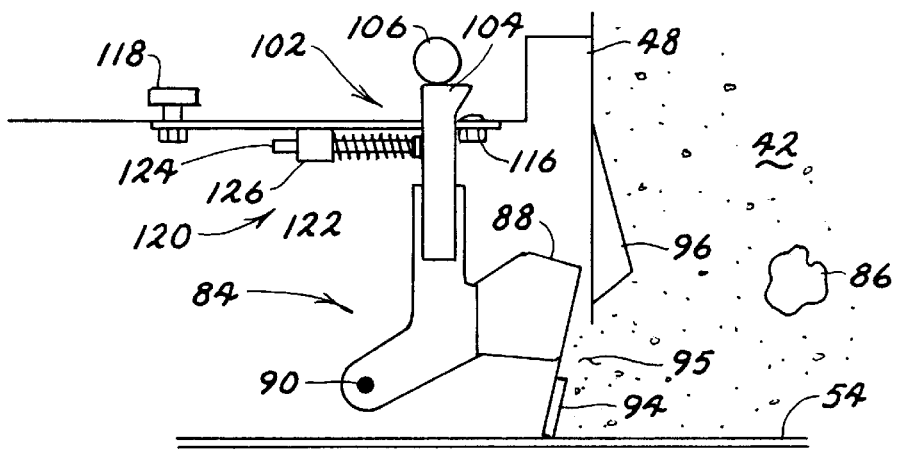
FIG. 8a is a schematic view of the gate mechanism of FIG. 7 illustrating the gate mechanism when the distribution rate is at a relatively low setting.
Figure 8B:
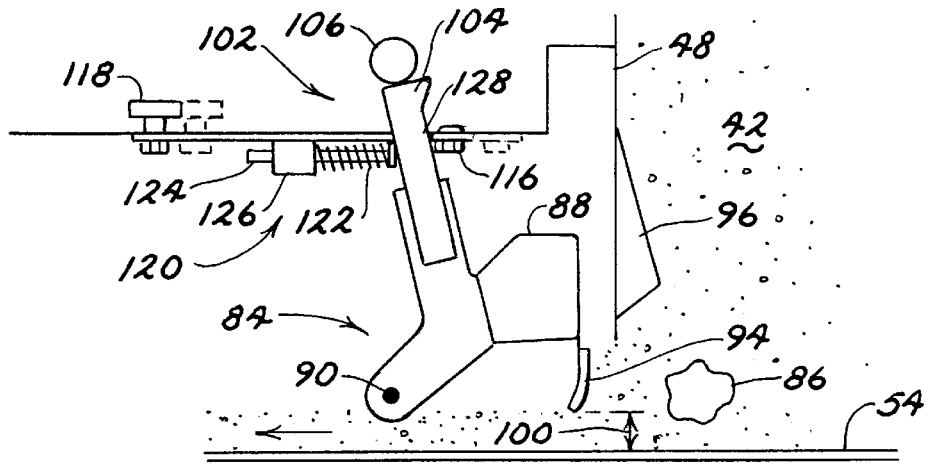
FIG. 8b is a schematic view of the gate mechanism of FIG. 7 illustrating the gate mechanism when the distribution rate is at a relatively moderate setting.
Figure 8C:
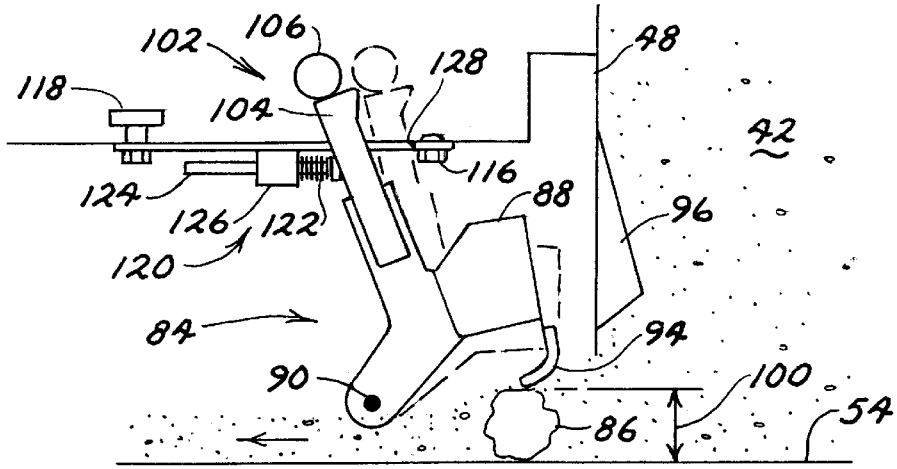
FIG. 8c is a schematic view of the gate mechanism of FIG. 7 illustrating a temporary gate displacement as a large nonconformity passes through the gate mechanism.

Referring now to FIGS. 8A–C, operation of the gate assembly 84 may be discussed. FIG. 8A illustrates the gate 88 as having been adjusted into direct or partial contact with the belt 54. This setting illustrates a relatively low distribution rate setting, as only a small amount of top dressing material 42 will be conveyed through the gate 88 by the belt 54. FIG. 8B illustrates the gate 88 as having been adjusted away from the low distribution rate setting of FIG. 8A to provide a greater preselected distribution rate. A mean distance 100 is established between the gate seal 94 and the belt 54 to provide the average preselected distribution rate. A nonconformity such a rock 86 having a dimension larger than the mean distance 100 is illustrated as being admixed within the top dressing material 42 of the hopper 46 and being directed toward the gate 88. Upon contacting the gate 88, the nonconformity or rock 86 is allowed to pass through the gate assembly 84 and out of the hopper 46 by the gate release device 102 rather than being retained within the hopper 46 and potentially damaging the belt 54 and/or gate 88 or even disrupting the distribution flow. As illustrated in FIG. 8C, the nonconformity 86 temporarily displaces the gate 88 from its preselected distribution rate setting about its pivot points 90 to increase the distance 100 between the gate seal 94 and the belt 54 a sufficient amount to allow passage therethrough. Note that as the nonconformity encounters and moves past the gate 88, it deflects the seal 94. As the gate 88 pivots, the biasing element or spring 122 is compressed between the gate adjusting handle 104 and the pin support 126. After the nonconformity 86 has passed through the gate assembly 84, the gate 88 is urged back into its preselected rate position by action of the biasing element or spring 122. As may be appreciated by those skilled in the relevant arts, a temporary deviation from the mean selected distribution rate occurs as a nonconformity such as a rock 86 or other debris is passed from the hopper 46.

Referring now to FIGS. 9A and 9B, additional aspects of the present invention are illustrated. As discussed herein, an important aspect of the present invention is the provision of a seamless conveyer belt 54. During routine maintenance or belt 54 replacement, it may be necessary to remove the belt 54 from the roller assemblies 58, 60. To facilitate removal of the continuous belt 54, a portion 24 of the frame 12 and hopper assembly 46 may be shifted with respect to the frame 12 and pivoted about hopper pivot points 49 as illustrated in FIG. 9A. Access to the belt 54 may then be gained by elevating a portion of the belt 54 and roller assemblies 58, 60 away from the frame 12 as illustrated in FIG. 9B. The distance between the roller assemblies 58, 60 may be decreased to facilitate removal of the belt 54. Replacement of the belt 54 may be made by placing a new belt 54 around the roller assemblies 58, 60, adjusting the distance between the rollers 58, 60, lowering the belt 54 and roller assemblies 58, 60 back onto the frame 12, and then re-shifting the hopper and frame portion 24 back into operating position.

Figure 10:
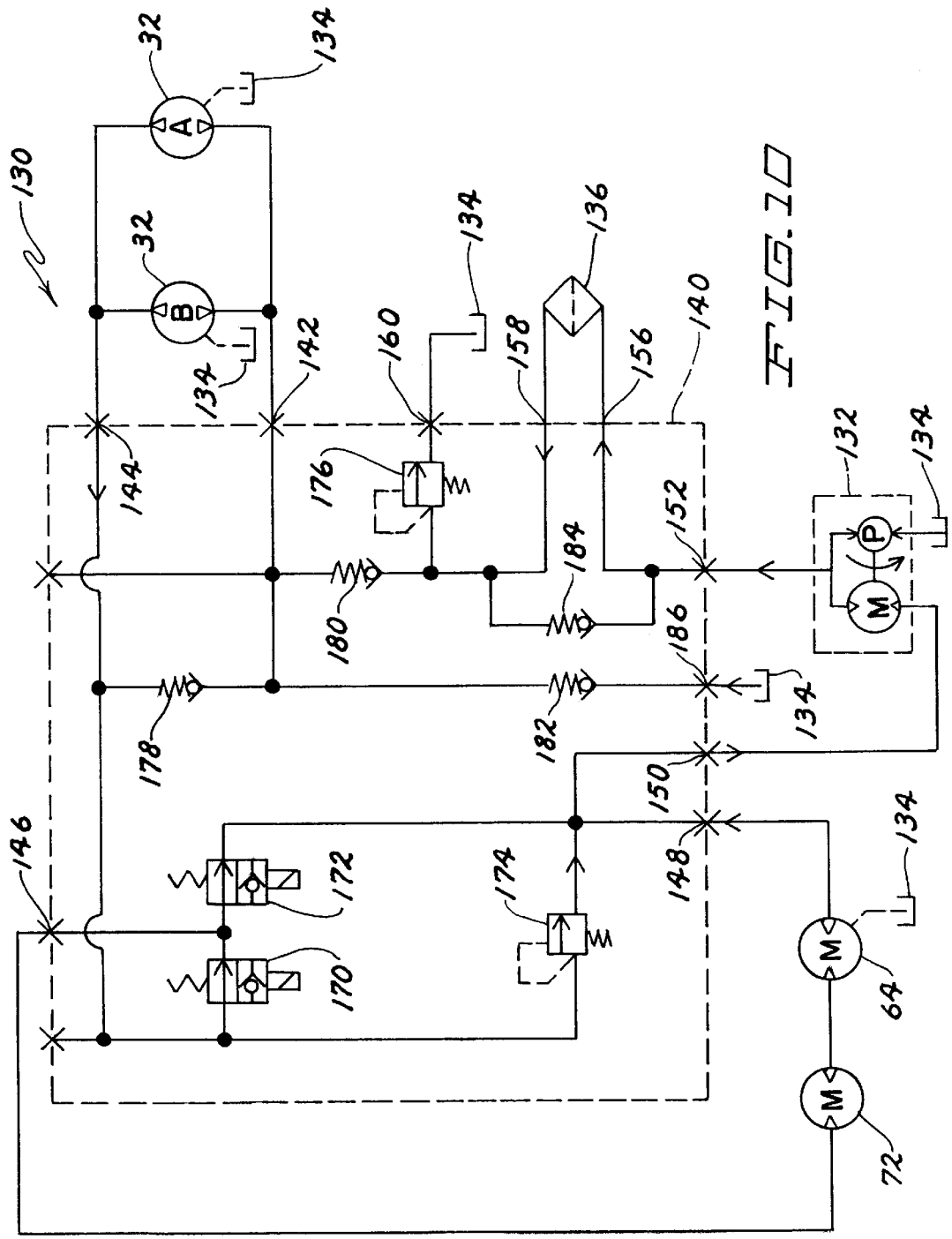
FIG. 10 is a schematic view of a hydraulic circuit for the top dresser of FIG. 1.

Referring now to FIG. 10, one preferred embodiment of the hydraulic circuit of the top dressing device 10 is disclosed as numeral 130. Hydraulic circuit 130 is substantially a closed-loop hydraulic system including the pair of wheel driven pumps 32, the brush assembly motor 72, the conveyer belt motor 64, a charge pump assembly 132, a reservoir tank 134, a filter 136, and a multi-function control block 140 having a plurality of ports. The wheel driven pumps 32 are fluidically coupled in parallel between a pump input port 142 and a pump output port 144. Brush assembly motor 72 and conveyer belt motor 64 are fluidically coupled in series between motor inlet port 146 and motor outlet port 148 of the control block 140. Charge pump assembly 132 is fluidically coupled between charge pump inlet port 150 and charge pump outlet port 152 of the control block 140. Charge pump assembly 132 is additionally fluidically coupled to the reservoir 134. The charge pump assembly 132 includes a mechanically coupled motor and pump assembly for maintaining a fluid charge at the wheel driven pump 32 inlets during operation. Preferably, the motor and pump of the charge pump assembly 132 have capacities of approximately 0.813 and 0.232 cubic inches per revolution, respectively. Importantly, at rest no fluid pressure is developed by the charge pump 132. Hydraulic fluid from the reservoir is added to the circuit 130 by the pump section of the charge pump assembly 132 in a predetermined ratio (from between 10 to 40%) to make up for fluid loss in the circuit 130, e.g., motor 72, 64 drains, etc. Additionally, the charge pump assembly aids in cooling the closed loop circuit 130 by introducing relatively cool reservoir fluid to the circuit 130. Filter 136 is coupled to the control block 140 between filter inlet port 156 and filter outlet port 158. Reservoir 134 is coupled to the control block 140 at reservoir outlet port 160.

The multi-function control block 140 includes a variety of mechanical and electromechanical components, including a normally-open brake solenoid valve 170, a normally-open motor solenoid valve 172, a high pressure relief valve 174, a low pressure relief valve 176, and check valves 178, 180, 182, 184. During non-operational intra-site transport of the top dresser 10, a low load mode may be selected wherein the fluid output from the wheel driven pumps 32 is introduced at pump output port 144, directed through the pair of normally open solenoid valves 170, 172, directed through the charge pump 132, through filter 136 and check valve 180, and returned to the wheel driven pumps 32 via pump input port 142. During top dressing operation, and upon operator activation of the motor solenoid valve 172 (via the remote switch 38), the wheel driven pump 32 output is directed to motor inlet port 146 and through the brush assembly motor 72 and belt motor 64 before returning to the wheel driven pumps 32 as before. Upon activation of the brake solenoid valve 170 by external braking controls (not shown), the wheel driven pump 32 output is directed through the high pressure relief valve 174 before returning to the wheel driven pumps 32. High pressure relief valve 174 thus imparts a predetermined load upon the wheel driven motors 32 which may be useful to brake the top dresser 10 under some conditions. The preferred ranges of operation of the high and low pressure relief valves 174, 176 are approximately 900–1500 psi, and 80 psi, respectively.

Control block 140 additionally includes a fill port 186 for introducing fresh fluid into the circuit, as during initial priming, etc. Fill port 186 is coupled to the pump input port 142 and wheel driven pumps 32 through a low pressure check valve 182 which permits air to be released during the refill operation.

Control block 140 further includes a check valve 184 for filter bypass, as for example upon filter 136 obstruction. Additionally, check valves 178 and 180 are provided for reverse operation of the top dresser 10. During reverse motion, wheel pump 32 output is received into the pump input port 142 and recirculated within the control block 140 to the pumps 32 via output port 144. Check valves 178, 180 prevent back-flushing the filter 136 and charge pump assembly 132 during reverse operation. Furthermore, during reverse operation of the top dresser 10 the brush and belt motors 72, 64 are inoperable.

One preferred embodiment of a hydraulic circuit 130 for the top dresser 10 of the present invention has been illustrated in FIG. 10 and described herein. Modifications and alterations may be appreciated by those skilled in the relevant arts. For example, the charge pump assembly 132 may be replaced with a diaphragm-based pump, a fluid intensifier, an external pump, etc. Furthermore, while embodiments of the present invention described herein references a tow-behind top dresser 10 used in conjunction with a traction vehicle 16, aspects of the invention may be applicable to other types of top dressers, such as vehicle mounted devices, etc., as appreciated by those skilled in the relevant arts. For example, the gate assembly 84 and gate release device 102 may be adapted for use on other types of particulate distribution devices. Similarly, the hydraulic circuit 130 may be adapted for use on another type of top dressing device.

Consequently, as the preferred embodiments of the above top dresser 10 have been described in detail with reference to the attached drawings, it is understood that various changes, modifications, and adaptations may be made without departing from the spirit and scope of the appended claims.

What is claimed is:

1. A top dresser for distributing particulate material onto a turf surface, the top dresser comprising:
   a hopper having an upper portion, a lower portion, a plurality of side surfaces and an aperture through which particulate material may pass;
   a movable surface positioned adjacent the lower portion of the hopper, the movable surface configured to transport particulate material through the aperture and out of the hopper; and a gate assembly including an elongated gate adjacent the aperture of the hopper and selectively positionable relative to the movable surface to control the rate at which particulate material is transported through the aperture, the gate assembly including a gate release device coupled to the gate, said gate release device displacing the gate away from the movable surface upon engagment with a nonconformity admixed within the particulate material.

2. The top dresser of claim 1, wherein the movable surface is a conveyor belt.

3. The top dresser of claim 2, wherein the conveyor belt is a substantially continuous, pre-manufactured belt.

4. The top dresser of claim 3, wherein a portion of the hopper is shiftable relative to the conveyor belt to permit access thereto.

5. The top dresser of claim 1, wherein the gate assembly includes a biasing element for urging the gate assembly towards the selected position.

6. The top dresser of claim 1, further comprising:

a towable frame in supporting relation to the hopper, said frame defining a longitudinal axis; and, at least one wheel assembly in supporting relation to the frame, said at least one wheel assembly being movably coupled to the frame, wherein said at least one wheel assembly is able to maintain contact with undulating terrain over which the top dresser traverses.

7. The top dresser of claim 6, wherein the at least one wheel assembly is pivotally coupled to the frame and movable about an axis substantially parallel to the longitudinal axis.

8. The top dresser of claim 7, wherein the longitudinal axis of the wheel assembly is further from the hopper than a rotational axis of the at least one wheel assembly.

9. The top dresser of claim 6, wherein the at least one wheel assembly is operatively connected to a power converter.

10. The top dresser of claim 9, wherein the power converter is a hydraulic pump.

11. The top dresser of claim 1, further including a brush assembly having a rotatable brush, the rotatable brush positioned adjacent the movable surface, wherein the rotatable brush sweeps particulate material from the movable surface and onto the turf surface.

12. A towable top dressing apparatus for distributing particulate material onto a turf surface, said top dressing apparatus comprising:

a frame;

at least one wheel assembly in supporting relation to the frame, said at least one wheel assembly being coupled to the frame and independently movable relative to the frame;

a hopper disposed upon the frame, said hopper having an upper portion, a lower portion, a plurality of side surfaces and an aperture through which particulate material may pass;

a movable surface positioned adjacent the lower portion of the hopper, the movable surface configured to transport particulate material through the aperture and out of the hopper; and a gate assembly including an elongated gate adjacent the aperture of the hopper and selectively positionable relative to the movable surface to control a rate at which particulate material is transported through the aperture, said gate assembly including a gate release device coupled to the gate, said gate release device displacing the gate away from the movable surface upon engagment with a nonconformity admixed within the particulate material.

13. The towable top dressing apparatus of claim 12, wherein the at least one wheel assembly is pivotally coupled to the frame.

14. The towable top dressing apparatus of claim 12, wherein the at least one wheel assembly is operatively connected to a power converter.

15. The towable top dressing apparatus of claim 14, wherein each power converter is a pump.

16. The towable top dressing apparatus of claim 12, wherein the movable surface is a conveyor belt.

17. The towable top dressing apparatus of claim 12, wherein the conveyor belt is a pre-manufactured belt having a substantially continuous surface.

18. The towable top dressing apparatus of claim 16, wherein the conveyer belt is supported between a pair of roller assemblies, and at least one of said roller assemblies having a friction enhancing surface for increasing the friction coefficient between said at least one roller assembly and the conveyer belt.

19. The towable top dressing apparatus of claim 16, wherein the friction enhancing surface is a metal oxide coating applied to said at least one roller assembly.

20. The towable top dressing apparatus of claim 10, further comprising a brush assembly having a rotatable brush, the rotatable brush positioned adjacent the movable surface, wherein the rotatable brush sweeps particulate material from the movable surface and onto the turf surface.

21. A towable top dresser for distributing particulate material onto a turf surface, the top dresser comprising:

a frame;

at least a pair of wheel assemblies, each wheel assembly being coupled to the frame, and at least one of the pair of wheel assemblies being coupled to a hydraulic pump;

a hopper having an upper portion, a lower portion, a plurality of side surfaces and an aperture through which particulate material may pass;

a movable surface positioned adjacent the lower portion of the hopper, the movable surface configured to transport particulate material through the aperture and out of the hopper, the movable surface being operatively coupled to a hydraulic motor; and a hydraulic circuit selectively coupling the hydraulic pump to the hydraulic motor and supplying pressurized fluid to the hydraulic motor as the top dresser is towed in a forward direction across the turf surface thereby advancing the movable surface, and uncoupling the hydraulic pump from the hydraulic motor as the top dresser is propelled in a reverse direction.

22. The towable top dresser of claim 21, further comprising:

a brush assembly having a rotatable brush, the rotatable brush positioned adjacent the movable surface, wherein the rotatable brush sweeps particulate material from the movable surface and onto the turf surface, said rotatable brush being driven by a hydraulic brush motor which is operatively coupled to the hydraulic circuit.

23. The towable top dresser of claim 21, wherein each of the wheel assemblies are coupled to a hydraulic pump.

24. The towable top dresser of claim 21, wherein the hydraulic circuit includes a reservoir and a charge pump assembly, the charge pump assembly operable to supply hydraulic fluid to the hydraulic pumps on a demand basis without a need to pressurize the hydraulic reservoir.

25. The towable top dresser of claim 24, wherein the charge pump assembly includes a motor operatively connected to a pump.

26. A top dresser for distributing particulate material onto a turf surfaces, the top dresser comprising:

a frame;

a hopper having an upper portion, a lower portion, a plurality of side surfaces and an aperture through which particulate material may pass, said hopper being pivotally coupled to the frame to permit the hopper to be pivoted relative to the frame and into a predetermined maintenance position; and a conveyer belt positioned adjacent the lower portion of the hopper, the conveyer belt configured to transport particulate material through the aperture and out of the hopper, said conveyer belt being removable from the top dresser when the hopper is in its maintenance position.

27. The top dresser of claim 26, wherein the conveyer belt is a pre-manufactured, substantially continuous belt.

28. The top dresser of claim 26, wherein the conveyer belt is supported between a pair of rolling assemblies, each of said rolling assemblies having a pair of axially-disposed ends, and at least one of the rolling assemblies being driven at a first end to advance the conveyer belt during a top dressing operation, and wherein the conveyer belt is removed from the pair of rolling assemblies at the ends opposite the first end.

29. The top dresser of claim 28, wherein at least one of the pair of rolling assemblies has a friction enhancing surface for increasing a friction coefficient between the at least one rolling assembly and the conveyer belt.

30. The top dresser of claim 29, wherein the friction enhancing surface is a metal oxide coating applied to at least a portion of the rolling assembly.

31. The top dresser of claim 28, wherein at least one of the pair of rolling assemblies has a substantially continuous external surface.

32. A towable top dresser for distributing particulate material onto a turf surface, the top dresser comprising:

a frame;

a hopper diposed upon the frame and having an upper portion, a lower portion, a plurality of side surfaces and an aperture through which particulate material may pass;

a movable surface positioned adjacent the lower portion of the hopper, the movable surface configured to transport particulate material through the aperture and out of the hopper, the movable surface operatively connected to a first hydraulic motor;

a gate assembly including an elongated gate adjacent the aperture of the hopper and selectively positionable relative to the movable surface to control the rate at which particulate material is transported through the aperture, said gate assembly including a gate release device coupled to the gate, said gate release device displacing the gate away from the movable surface upon engagement with nonconformities admixed within the particulate material;

a brush assembly having a rotatable brush, the rotatable brush positioned adjacent the movable surface, wherein the rotatable brush sweeps metered particulate material from the surface of the conveyor belt and onto a turf surface, the brush assembly operatively connected to a second hydraulic motor;

a wheel assembly coupled to the frame to maintain contact with undulating terrain over which the towable top dressing apparatus traverses, and operatively connected to a hydraulic pump; and a hydraulic circuit operatively coupling the first and second hydraulic motors with the hydraulic pump.

* * * * *